United States Patent
Blanchard et al.

(10) Patent No.: US 9,483,452 B2
(45) Date of Patent: Nov. 1, 2016

(54) GENERATING DOCUMENT CONTENT FROM APPLICATION DATA

(71) Applicant: Apple Inc., Cupertino, CA (US)

(72) Inventors: Terence D. Blanchard, San Jose, CA (US); Neil V. Jhaveri, San Jose, CA (US)

(73) Assignee: APPLE INC., Cupertino, CA (US)

( * ) Notice: Subject to any disclaimer, the term of this patent is extended or adjusted under 35 U.S.C. 154(b) by 509 days.

(21) Appl. No.: 13/631,606

(22) Filed: Sep. 28, 2012

(65) Prior Publication Data

US 2014/0095990 A1   Apr. 3, 2014

(51) Int. Cl.
*G06F 17/24* (2006.01)

(52) U.S. Cl.
CPC ............. *G06F 17/24* (2013.01); *G06F 17/248* (2013.01)

(58) Field of Classification Search
CPC . G06F 17/2247; G06F 17/24; G06F 17/3089
See application file for complete search history.

(56) References Cited

U.S. PATENT DOCUMENTS

| | | | |
|---|---|---|---|
| 5,794,259 A | 8/1998 | Kikinis | |
| 5,799,115 A | 8/1998 | Asano et al. | |
| 6,421,693 B1 | 7/2002 | Nishiyama et al. | |
| 7,962,525 B2* | 6/2011 | Kansal | 707/802 |
| 8,136,034 B2 | 3/2012 | Stanton et al. | |
| 8,209,336 B2* | 6/2012 | Patry et al. | 707/749 |
| 8,655,895 B2* | 2/2014 | Vanden Heuvel et al. | 707/755 |
| 2002/0073114 A1* | 6/2002 | Nicastro et al. | 707/500 |
| 2003/0208534 A1* | 11/2003 | Carmichael | H04L 12/1813 709/203 |
| 2004/0123244 A1* | 6/2004 | Campbell et al. | 715/517 |
| 2004/0153969 A1* | 8/2004 | Rhodes | 715/515 |
| 2005/0198066 A1* | 9/2005 | Meyer | 707/104.1 |
| 2008/0177611 A1* | 7/2008 | Sommers et al. | 705/8 |
| 2008/0256113 A1* | 10/2008 | Rasmussen et al. | 707/102 |
| 2010/0293048 A1* | 11/2010 | Singolda et al. | 705/14.43 |
| 2011/0055687 A1* | 3/2011 | Bhandar et al. | 715/235 |
| 2011/0235909 A1 | 9/2011 | Chenthamarakshan et al. | |
| 2012/0001917 A1* | 1/2012 | Doganata et al. | 345/440 |
| 2012/0054355 A1* | 3/2012 | Arrasvuori | G06Q 10/10 709/229 |
| 2012/0150577 A1* | 6/2012 | Berg et al. | 705/7.12 |
| 2012/0191500 A1* | 7/2012 | Byrnes et al. | 705/7.19 |
| 2012/0284638 A1* | 11/2012 | Cutler | G06Q 10/00 715/751 |
| 2013/0054697 A1* | 2/2013 | Cha | 709/204 |
| 2013/0091440 A1* | 4/2013 | Kotler | G06Q 10/10 715/753 |
| 2013/0132488 A1* | 5/2013 | Bosworth | H04L 51/32 709/206 |
| 2013/0191719 A1* | 7/2013 | Underhill et al. | 715/231 |
| 2014/0019867 A1* | 1/2014 | Lehtiniemi et al. | 715/738 |

FOREIGN PATENT DOCUMENTS

WO   WO 2013098587 A1 *   7/2013

* cited by examiner

*Primary Examiner* — Sanchita Roy

(57) ABSTRACT

Methods and apparatus of generating document content are disclosed. Document content is generated by identifying a location in a document at which to insert content, the location associated with a content template, generating the content in accordance with the content template and application data generated by an application, and inserting the content into the document at the location in the document. The document content generation can further include retrieving application data from the application in accordance with a data mapping that maps application output data to the application data references in the template, where generating the content comprises generating text by replacing application data references in the template with the application data in accordance with the data mapping. The document content generation can further include retrieving one or more instances of previous application data from a historical record of previous application output.

20 Claims, 4 Drawing Sheets

GENERATING DOCUMENT CONTENT FROM APPLICATION DATA

TECHNICAL FIELD

The present invention relates generally to storage of information in computer systems. More particularly, the present embodiments relate to automatic creation and updating of information in documents stored on computer systems.

BACKGROUND

Electronic documents such are used to store data such as text and images in computer systems. The data in a file can be stored on a storage medium such as a disk, flash memory, random-access memory, or the like. Users can write notes in computer software applications such as text editors, word processors, note-taking applications, reminder applications, and the like. The notes are ordinarily represented as unstructured, free-form text, and can also include graphics images, and/or other types of media objects such as video and audio data interspersed with or attached to the text. Notes can be stored in files, with the notes application providing a simplified interface to editing files, in which notes are presented to the user as text documents that need not be explicitly saved or loaded in files, as the notes application performs file saving and loading operations. A user can enter content for notes using input devices such as a keyboard, speech recognition, and so on, without restrictions on the format of the entered text. Thus, the notes application does not perform any substantial processing or interpretation of the contents of the note, beyond general processing such as font formatting and making the text available for searching. Thus, computer-based notes applications are similar to paper notebooks, with the notes being stored on the computer instead of on paper.

SUMMARY

Methods and apparatus are provided to simplify the process of creating notes by automatically generating portions of notes specified by references in the notes to templates that translate current and historical information retrieved from applications and other sources into note content that can be updated automatically as the information changes. The references to the templates for generating content can be placed in notes by users via a user interface or automatically by identifying locations of content produced by the templates in previously generated notes, such as notes associated with data produced by various applications, including calendars, task management applications, and other applications that maintain time-related data in which instances of the data can be associated with notes.

For example, meeting notes often have a defined format that includes a list of attendees, action items, notes from the meeting, and so on. A template note with headings and blank spaces in which to fill in information can be used as a starting point for creating a new note. However, the template does not automatically provide any information specific to the current meeting. The process of creating notes can be streamlined by using other information such as calendar data and historical notes. In one example, when creating a new note, a user's calendar data can be consulted. A meeting that corresponds to the meeting for which the notes are being prepared can be identified in the calendar, e.g., a recurring meeting that occurs every Monday. Information from the recurring meeting's calendar item and/or notes used for past related meetings can be automatically inserted into the new note.

A database of historical notes can also be queried to identify notes previously created at a similar time of day, day of the week, and the like. The format of such identified previous notes can be automatically used for the new note. The content generated for the note based on the calendar and other historical information is referred to herein as generated content 110. For example, a generated attendee list can be inserted into the note to cause an attendee list to be automatically generated based upon the user's calendar entry for the meeting, and included in the note. The generated attendee list in the note can be updated automatically as the attendee list in the user's calendar entry changes. In one embodiment, the existence of meetings not on a calendar can be inferred based upon locations of people who are related to each other in some way. In another embodiment, notes can be shared among users who are located in a common geographical area.

In one embodiment, document content is generated by identifying a location in a document at which to insert content, the location associated with a content template, generating the content in accordance with the content template and application data generated by an application, and inserting the content into the document at the location in the document.

Embodiments may include one or more of the following features. The generation of document content can also include retrieving application data from the application in accordance with a data mapping that maps application output data to the application data references in the template, wherein generating the content can include generating text by replacing application data references in the template with the application data in accordance with the data mapping. The application data retrieved from the application and used to generate the content can include current application data produced by the application at a current time.

The generation of document content can also include retrieving one or more instances of previous application data from a historical record of previous application output, wherein the application data retrieved from the application and used to generate the content can include at least one of the instances of previous application data. The previous application data can be associated with one or more attributes, and the generation of document content can further include determining a degree of similarity between the one or more instances of previous application data and the current application data, and selecting the at least one of the instances of previous application data used to generate the content based upon the degree of similarity between the one or more instances of previous application data and the current application data.

Similarity of data can be determined based upon textual similarity of the data being compared, temporal proximity of the data being compared, or a combination thereof. Textual similarity of the data can be based upon a comparison of the number of shared words in the data being compared. Temporal proximity of the data can be based upon a difference between dates associated with the data being compared. The current application data can be an instance of a recurring event, and the one or more instances of previous application data can be associated with one or more previous instances of the recurring event. The previous application data can be associated with a previous note, and generating the content can include including at least a portion of the previous note in the content. The portion of the previous note can be similar to the current application data.

The generation of document content can further include updating the content in response to a change in the application data. The location in the document at which to insert content can be based upon a position of a tag placed in the document by a user via a user interface.

The generation of document content can further include identifying one or more locations of previous content produced by the template in previously generated notes, wherein the location in the document at which to insert the content can be based upon the one or more locations of previous content produced by the template.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Figure 1:
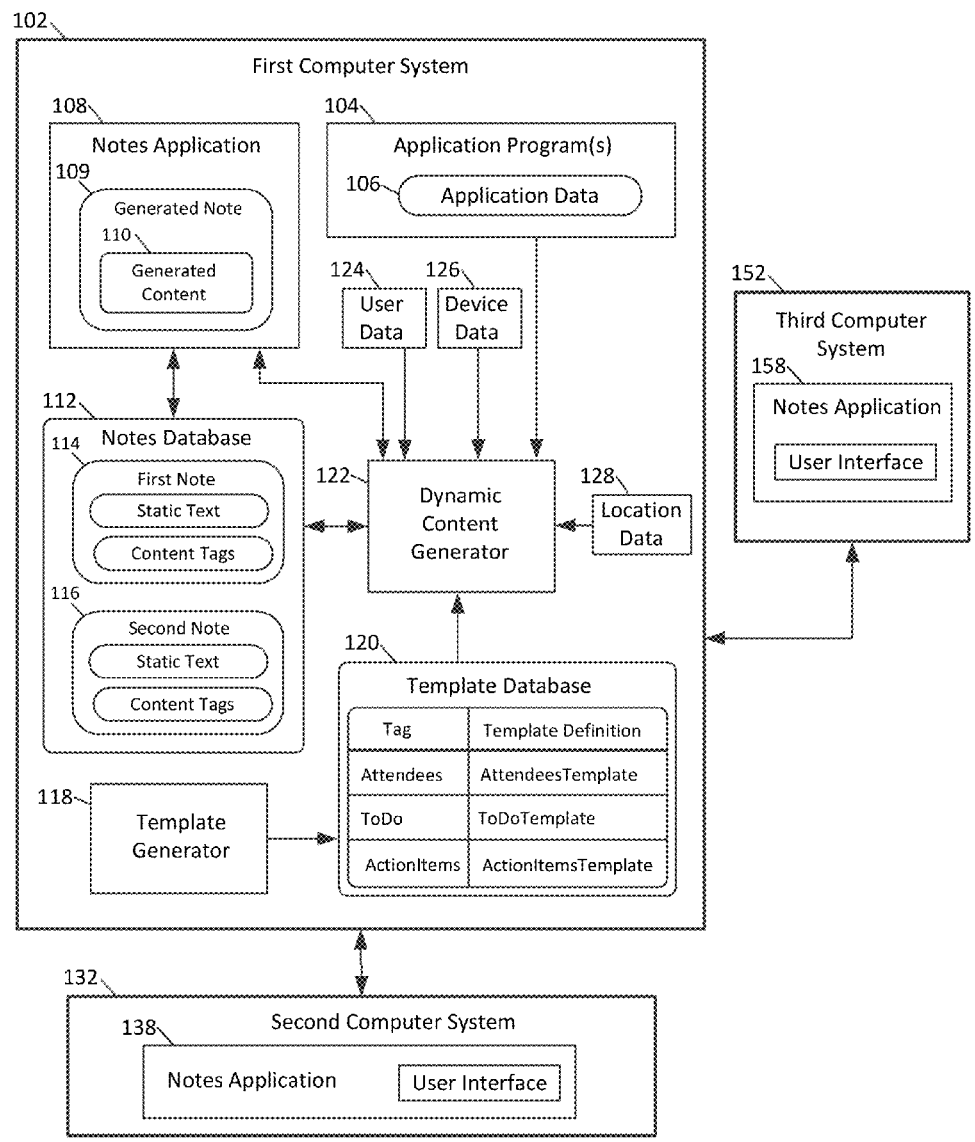
FIG. 1 is a representative drawing of a document content generator in accordance with one or more embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Methods and apparatus are provided to simplify the process of creating notes by automatically generating portions of notes specified by references in the notes to templates that translate current and historical information retrieved from applications and other sources into note content that can be updated automatically as the information changes. The references to the templates for generating content can be placed in notes by users via a user interface or automatically by identifying locations of content produced by the templates in previously generated notes, such as notes associated with data produced by various applications, including calendars, task management applications, and other applications that maintain time-related data in which instances of the data can be associated with notes.

For example, meeting notes often have a defined format that includes a list of attendees, action items, notes from the meeting, and so on. A template note with headings and blank spaces in which to fill in information can be used as a starting point for creating a new note. However, the template does not automatically provide any information specific to the current meeting. The process of creating notes can be streamlined by using other information such as calendar data and historical notes. In one example, when creating a new note, a user's calendar data can be consulted. A meeting that corresponds to the meeting for which the notes are being prepared can be identified in the calendar, e.g., a recurring meeting that occurs every Monday. Information from the recurring meeting's calendar item and/or notes used for past related meetings can be automatically inserted into the new note.

A database of historical notes can also be queried to identify notes previously created at a similar time of day, day of the week, and the like. The format of such identified previous notes can be automatically used for the new note. The content generated for the note based on the calendar and other historical information is referred to herein as generated content 110. For example, a generated attendee list can be inserted into the note to cause an attendee list to be automatically generated based upon the user's calendar entry for the meeting, and included in the note. The generated attendee list in the note can be updated automatically as the attendee list in the user's calendar entry changes. In one embodiment, the existence of meetings not on a calendar can be inferred based upon locations of people who are related to each other in some way. In another embodiment, notes can be shared among users who are located in a common geographical area.

FIG. 1 is a representative drawing of a document content generator 102 in accordance with one or more embodiments. A computer software application such as a notes application 108 can include features to insert generated content 110 of various types into a note 114 or other type of document at locations indicated by content insertion tags to create a generated note 109 that includes the generated content 110. In one embodiment, the first note 114 includes content insertion tags and static text, but not generated content 110, in which case the notes application creates a generated note 109 that includes the generated content 110 when displaying the note 114, and stores the note 114 without generated content 110. In another embodiment, the generated content 110 is inserted into the note 114 stored in the notes database 112, and the dynamic content generator 122 can identify the sections of the generated note 109 that are generated content 110, so that the generated content 110 can be replaced with updated generated content, e.g., when the application data 106 changes. The content insertion tags indicate the type of content to be inserted into the note and the and location in the note 114 at which the content is to be generated, and can be, for example, alphanumeric tags, names, or codes, e.g., the tag "Attendees" can be placed in the note 114 to cause the content generator 122 to insert an attendees list as the generated content 110 of the generated note 109. Thus, the content generator 102 processes the content insertion tags to automatically create and update generated content 119 in the generated note 109 or other type of document. The content insertion tags reference templates 120 that specify how the generated content 110 is to be generated, formatted, and inserted into a section of the note 114. A user can include arbitrary text content, i.e., static text, interspersed with the content insertion tags, and can format the note 114, e.g., using text fonts and the like, as desired. The content insertion tags embedded in the note 114 therefore indicate replaceable sections of the note 114, and the sections of an existing note 114 can be used and/or replaced when creating a new 114 note. When a note 114 is constructed, it can also be tagged with attributes, such as beginning and ending locations or markers of sections associated with content insertion tags, so that sections of the note 114 can be identified, and sections of generated content can be updated and/or deleted from the note 114.

In one or more embodiments, the generated content 110 can be text or other types of content such as images, videos, audio, or the like, that is based on information maintained by application programs 104. The information can be user-specific, such as information in the user's calendar, task list, or email, the geographic location of the user, content files owned by or associated with the user, and so on. An initial instance of the generated content 110 is inserted into the note 114 by the dynamic content generator 122 when the content tag is inserted by a user via a user interface of a notes application 108. The dynamic content generator 122 can create generated notes 109 based upon user data 124, e.g., attributes of the user, device data 126, e.g., attributes of the computer system 102, which can be a mobile device, and/or location data 128, e.g., the geographical location of the computer system 102.

In one or more embodiments, the content is automatically updated to reflect changes to source data 106 upon which the content is based. Changes to the source data can be made in the application 104 that generates the content. In one example, the generated content 110 is updated each time the note 114 is opened, e.g., by querying the application 104 for the information 106 and formatting the information as specified in the content insertion tag each time the note 114 is opened. In another example, the generated content 110 can be updated automatically each time the application data 106 is updated while the generated note 109 is open, e.g., being displayed, and/or updated in response to a user command to refresh the generated note 109. The generated content 110 can be updated at other times as well, depending on the needs or preferences of the user.

In one or more embodiments, a content insertion tag can be one of a number of different types that correspond to particular types of content to be inserted in the note 114. The content insertion tag types include an Attendee List, a To Do List, an Action Items list, and the like. An Attendee List item can be inserted into a note 114 to cause a meeting attendee list to be automatically generated based on a meeting invitation in a calendar application or other application data 106 and inserted into the note 114. The To Do List item inserts a list of tasks based on a user's task list in a task management application (e.g., a reminders or calendar application), with the list of tasks being displayed in a generated note 109 and being updated automatically to reflect changes in the task list managed by the task management application. The Action Items List inserts an action items list, which is, for example, another type of list of tasks to be completed. In one embodiment the action items can remain static in the generated note 109 after being inserted, to be edited using a note editor of the notes application 108, or can be updated dynamically using a link to a To Do list application or database.

Users can add generated content 110 to notes 114 by inserting codes or tags represent the desired type of content into the note. Content such as an attendee list for a meeting can be generated based on the code or tag and automatically inserted into the note, e.g., at the location of the code in the note. The codes are not ordinarily displayed as part of the note. A meeting attendee code, for example, can be inserted in a note 114 to generate an attendee list based on people who are invited to or have accepted a meeting in the user's online calendar.

In one example, when a note 114 is created at a time during which a meeting is scheduled, the note 114 is automatically identified as being for a meeting, and a previous note 116 for a previously-held meeting of the same type (or topic) can be identified. If a calendar invitation for the meeting has an attendee list, then an attendee code or list can be inserted into the new note 114. In another example, a previous instance of the meeting (e.g., the same date and time, but in a previous week), can be identified based on attributes of the meeting, such as the calendar invite time, subject, attendees, or the like. In one or more embodiments, if the previous instance of the meeting has an associated note 116, then the previous note can be used to generate codes and/or data for the new note. For example, a section heading or content code from a note 116 associated with the previous meeting can be inserted into the new note 114. A note 114 can be attached to a calendar event such as a scheduled meeting, so that the invitees on the calendar event gain access to the note 114 through the calendar event.

In one example, the Attendee List code is inserted into a note 114 by a user editing the note via the notes application 108, and subsequently the Attendee List code in the note is replaced with the attendee list for the meeting. Alternatively, the attendee list can be inserted directly into the note 114 without including attendee code. The attendee list for the note can be generated based upon the attendee list associated with the user's calendar entry for the meeting. In one example, the attendee list can be generated at the time the list is inserted directly into the note, and/or or at other times at which the note is accessed or the attendee list changes.

In one or more embodiments, multiple users can have notes 114 linked to a common application 104 or database, in which case changes to the data in the application cause the corresponding content insertion tags that may be used in any of the users' notes 114 to be updated to reflect the changes. Other types of content are contemplated for use with other applications 104. A new content insertion tag can be created by defining a format for the data to be inserted into the note and linking the format to an application using a data input/output interface of the application, such as a programmatic interface to the calendar application in the example of the Attendee List. New content insertion tags can be defined by creating a template for the new tags as described elsewhere herein.

In one or more embodiments, content insertion tags are converted to generated content 110 in a note 114 by the dynamic content generator 122 based upon templates retrieved from a template database 120. When the content tag of a particular type is inserted in a note in the notes application 108, the tag value can be included in the note 114, and the generated content 110 can be generated by retrieving, from the template database 120, a format template definition associated with the tag, and processing the template definition to create the generated content 110. The template definition can be implemented in a markup language, e.g., HTML, or a special-purpose markup language, and can include computer program code in a language such as JavaScript™ to extract and format data from other applications 106. For example, a tag named "Attendees" can be stored in the template database 120 in association with a template definition named "AttendeesTemplate" which can be used to generate generated content 110 for an attendees list. The template definitions can be generated by a template generator 118, which is, for example, a graphical user interface-based editor for composing note templates and adding references, e.g., data field names, to the templates in places where values from the application data 106 is to be substituted into the template. The template generator can also be used to define data mappings that specify which items of the application data 106 are to be mapped to which references in the template definitions. Users can create generated content 110 in notes 114 using the notes application 108 without knowledge of the template definitions. Users can refer to the templates by their tags to cause the type and format of data associated with the template to be inserted into a note 114.

In one or more embodiments, users can create a note 114 by entering content, such as text, into a notes application 108, to be stored in the note. For example, a user can create a section in the note with a heading named Attendees, and enter the names of the attendees based on their email addresses, business cards, and so on. As described above, the dynamic content generator 122 automates the process of entering certain types of content into notes, such as the attendee list. The user interface of the notes application 108 provides a command to create a note, and a command to insert an automatically-generated attendees list. The command can have a name such as Insert Attendees. The insert attendees command inserts an Attendees content tag into the note 114 at the current insertion point or cursor position in the note 114. The content for the Attendees list can be generated by, for example, querying the user's calendar for a meeting scheduled for the associated time (or the time at which list is inserted into the note), finding the names of people on the invitation list of the calendar entry, and automatically inserting the names of the people on the invitation list into the note under a heading or label such as "Attendees." In one or more examples, an attendee list component tag, which is not necessarily displayed as part of the note content, is added to the note in a position near or adjacent to the attendees list. In one embodiment, the location of the attendees list in the generated note 109 can be identified by finding location of the attendee list content tag in the generated note 109.

In one or more embodiments, the user can add generated content 110 of various types to the note 114. For example, as described above, to insert a dynamically-generated attendee list, the user can select a menu option in the notes application 108, e.g., from an Inset menu, labeled "Insert Attendee List" to insert the Attendee List tag, or enter a special text string that can be detected by text analysis (e.g., an identifier that corresponds to the tag followed by a colon, such as "attendees:"). Thus, a user can inserts dynamically-generated content into a note by typing text that is recognized and translated to a content tag, or by using a menu to insert the content tag for the desired content into the note. Automated actions are then performed by the dynamic content generator 122 based on the content tags to retrieve information indicated templates associated with the tags and insert the information into the note. The inserted information then forms the generated content 110 and is displayed as part of the generated note 110.

As another example, the user can insert an Action Items content tag into a note 114, e.g., by typing the command "action:" in the notes application 108. When an Action Items tag is inserted, the dynamic content generator 122 can perform search of application data 106 according to instructions in a template associated with the tag to locate previous meetings and determine if there were action items in the previous meeting. The action items from the previous meeting can then be brought into the new meeting. In one or more embodiments, action items can be included at the end of a note 114 for a meeting. A To Do list item or reminder can be generated based upon the action item(s) from the generated note 109. Subsequently, when the user completes the To Do list item or reminder, e.g., by checking it off in a user interface, the corresponding action item in the generated note 109 is updated to have a checked-off appearance.

In one or more embodiments, the notes 114 are stored on a distributed storage such as a cloud-based environment, e.g., on a network server, so that they are accessible to multiple users of multiple computer systems. For example, notes in a notes database 112 can be accessible to users of the first computer system 102, a second computer system 132 on which a notes application 138 is installed, and a third computer system 152 on which a notes application 158 is installed.

Figure 2:
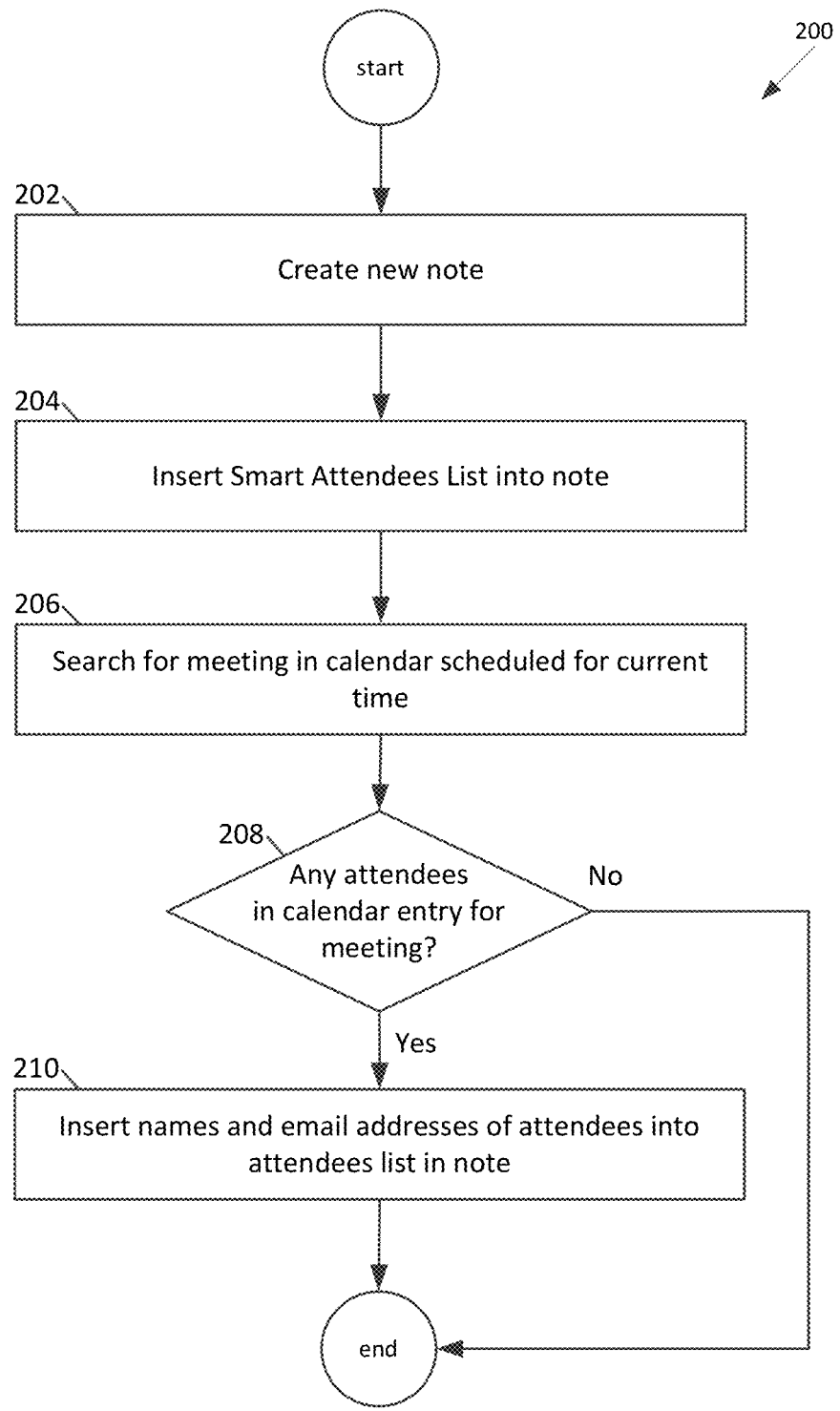
FIG. 2 is a representative flow chart showing a process of generating document content in accordance with one or more embodiments.

FIG. 2 is a representative flow chart showing a process 200 of generating a note in accordance with one or more embodiments. The process 200 can be in invoked by a user in a notes application 108 upon receiving a meeting notice or other event having an associated template. Process 200 can represent the dynamic content generator 122 of FIG. 1 and can be implemented as, for example, computer program code encoded on a computer readable medium and executable by a processor of a computer system. At block 202, the user invokes a command in the notes application 110 or other application to create a new note 114. In one or more embodiments, each note 114 is related to a function or event, such as a meeting. A note 114 can be time related, and can involve calendar events. Other functions to which notes 114 can be related include reminders, to do lists, and the like.

At block 204, the user invokes a command that inserts an Attendees List tag into the note. The Attendees List can be inserted by selecting a corresponding option on an insert menu, or by typing a text identifier into the note, such as "attendees:". Block 206 searches for a meeting in the user's calendar at the current time. When such a meeting is found, block 208 determines if there are any invitees or attendees listed in the calendar entry for the meeting. If there are no attendees, the process ends. Otherwise, if there the meeting has one or more attendees, block 210 inserts the name and email address of each attendee in the note. The names and email addresses are displayed in the note in the notes application 108 as a result of being inserted into the note at block 210.

Figure 3:
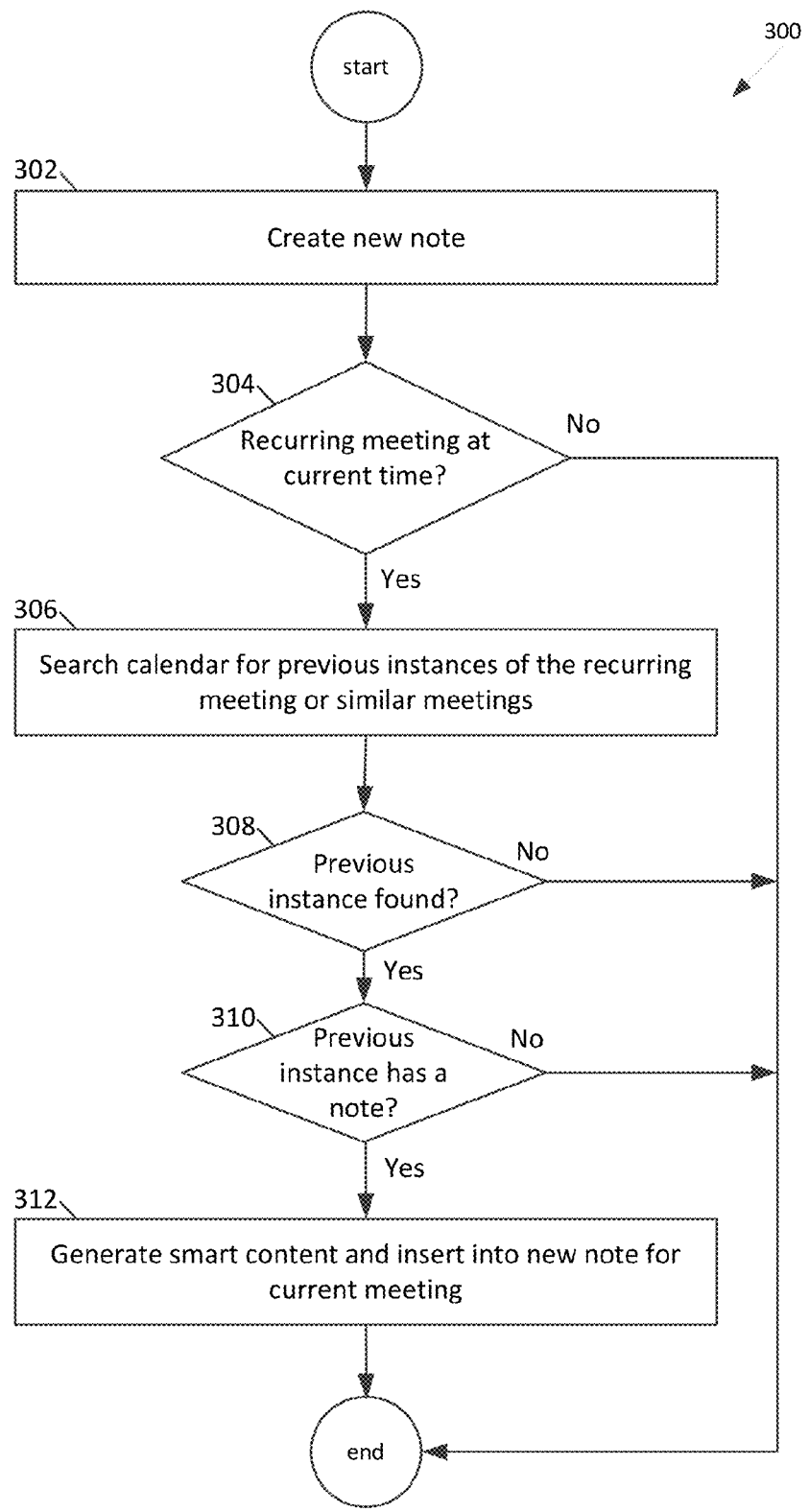
FIG. 3 is a representative flow chart showing a process of generating document content based upon one or more previous documents in accordance with one or more embodiments.

FIG. 3 is a representative flow chart showing a process 300 of generating note content based upon one or more previous notes in accordance with one or more embodiments. Process 300 can represent the dynamic content generator 122 of FIG. 1 and can be implemented as, for example, computer program code encoded on a computer readable medium and executable by a processor of a computer system. Process 300 identifies common patterns in the content of notes associated with recurring meetings. For example, a user may have a class every Monday morning, or a weekly staff meeting, both of which can be represented by recurring meetings.

Process 300 can be in invoked by a user via the notes application 110 when the user decides to create a new note. At block 302, the user invokes a command in the notes application 110 that creates new note 114. The command can be a general note creation command, and need not be specific to any particular type of note, except that the command may be designated as a dynamic content creation command. Block 304 consults the user's current calendar to determine whether the user is in a recurring meeting at the current time (i.e., the time at which the process 300 is invoked) by, for example, checking for a recurring calendar entry that has an occurrence at the time that the user invokes the process 300. If block 304 determines that the user is in a recurring meeting, or there is a recurring meeting scheduled for the current time, then block 306 searches the user's calendar and/or other application data (e.g., the user's email messages) for one or more previous instances of the recurring meeting or similar meetings.

To identify similar meetings, block 306 compares the current meeting to past meetings based on common factors or attributes of the meetings. The degree of similarity of the meetings is proportional to the degree of similarity of the factors or attributes(s) of previous meeting, and the number of attributes of the two meetings that are the same or similar. The attributes of meetings that can be compared include information from the meetings' calendar entries, such as the name or topic of the meeting, the meeting description, location, and attendees, groups associated with attendees, as well as other information associated with the meetings, such as the note(s), if any. Text attributes such as meeting subject, description, and attendee names or email addresses can be evaluated for degree of similarity. Text similarity can be determined using techniques such as counting the number of shared words and/or other measures. Time similarity, i.e., temporal proximity, can be calculated based on the difference between times, e.g., two meetings are more similar when they are closer together according to factors such as time of day, day of week, and absolute date of the meetings being compared.

In one example, block 306 searches backward in time, starting with the meeting that is prior to the current meeting in the recurrence, and also searching for meetings that have similar attributes, such as similar attendees lists, similar topics, the same time of day, the same day of the week, have notes with similar content, and so on. In one embodiment, one meeting instance is selected, with higher precedence given to instances of the recurring meeting, and lower precedence given to other meetings that have similar attributes, with the precedence being proportional to the degree of similarity to of the previous meeting to the current meeting. In another embodiment, multiple previous meeting instances can be selected, and information (e.g., notes) from the multiple selected meeting instances can be merged together for use in creating the notes for the current meeting.

Block 308 determines whether at least one previous instance was found at block 306. If so, block 310 determines whether the meeting found at block 306 is associated with an existing note. If so, block 312 inserts one or more content insertion tags into the new note 114 based upon the selected existing note(s). In one example, block 312 inserts a generated content 110 into the new note corresponding to each content insertion tag in an existing note. The content 110 for the new note can be based on current data 106, 124, 126, 128, and is generated according to a template associated with each content insertion tag in the existing note. That is, the tags are copied from the previous note, but the generated content 110 is not copied when generating a new note 109 based on an existing note 114.

In one or more embodiments, the existence of meetings not on a calendar can be inferred based upon geographical locations of people who are related to each other in some way, e.g., members of an organization group or a group that has attended previous meetings that are on the calendar. For example, if two or more users who do not have a scheduled meeting on their calendars are in the same room having an unscheduled meeting, and one of the users creates a new note on a computing device, then location services detects that the users are in the same location.

Collaborative Editing

In one or more embodiments, notes can be shared among users who are located in a common geographical area. A user who creates a note on their computing device can see notes of other users who are located nearby. The other users can also open up the first user's note on their computing devices. Location services detect that the users are in the same location, and the person who created the note can see nearby notes users and, if so desired, associate the other users with the note. Each of the users associated with or added to the note can see the note as it is being typed, add text to the note, and so on. In one or more embodiments, each user sees a different color cursor and can edit the note in real time, in a real-time collaborative editing experience. Each user can receive a persistent copy of the note once the master owner of the note has invited another people. The users need not perform any actions to copy their notes into a file, because the content entered by the users is included in the note.

If a user has notes open, the user's location is determined by location services, e.g., using wireless network to triangulate the location. If two or more users are in the same location at the same time, and the users have a note or the notes application open at the same time, then a user who creates a new note has an option to invite people who the notes application recognizes are nearby to join that session. In one example, the notes application scans the WiFi network to which the inviting user is connected to identify other nearby users who are candidates for invitations to join the session.

In one example, automatic formatting is provided in the notes application. If a user enters a particular character, the note text can be reformatted based on the character. If a user enters the number 1 followed by a period and a space, the number 1 is automatically formatted as a list item, e.g., by indenting the text. Thus, if a user types an asterisk, dash, or number, the text is automatically formatted. Section headings can also be generated and formatted based on text entered by the user. For example, if a user enters the text "ideas:" then the text "ideas" is reformatted as a section heading. The automatic formatting enables a user to create well-formatted notes without needing to select and apply text formatting commands to the text.

In one or more embodiments, a file of an arbitrary type, e.g., a word processor document, spreadsheet, or the like, can be dragged and dropped in the note, which causes the document to be attached to the note. Then each user who has access to the note can open, edit, and save the attachment to the note, with the modification made by each user being accessible to other users in the attachment to the note.

Figure 4:
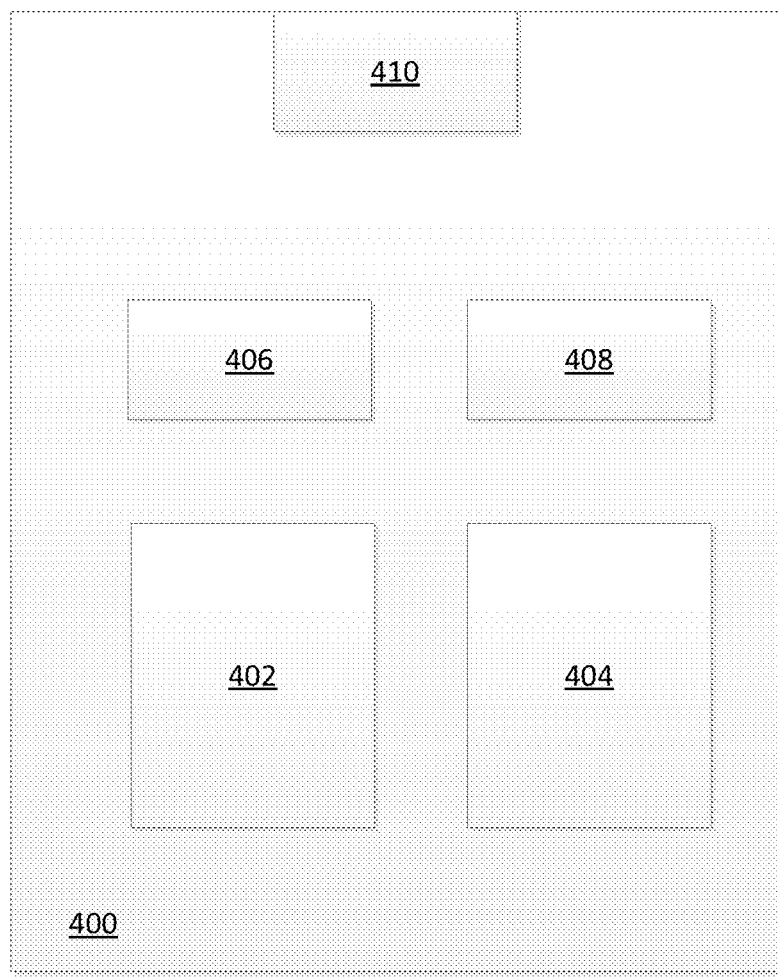
FIG. 4 shows a system block diagram of computer system used to execute the software of an embodiment.

FIG. 4 shows a system block diagram of computer system 400 used to execute the software of an embodiment. Computer system 400 includes subsystems such as a central processor 402, system memory 404, fixed storage 406 (e.g., hard drive), removable storage 408 (e.g., FLASH), and network interface 410. The central processor 402, for example, can execute computer program code (e.g., an operating system) to implement the invention. An operating system is normally, but necessarily) resident in the system memory 404 during its execution. Other computer systems suitable for use with the invention may include additional or fewer subsystems. For example, another computer system could include more than one processor 402 (i.e., a multi-processor system) or a cache memory.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method for generating document content, the method comprising: at a computing device:
   creating a document using a content template;
   identifying, based on the content template, a location in the document to insert dynamic content, wherein the dynamic content is linked to an application that allows multiple users of a joint session of the application to concurrently edit the document in real time;
   identifying historical application data associated with a different document previously generated by the application;
   providing permission to edit the dynamic content to a user of the multiple users of the joint session based on:
      (1) a proximity of the user to the computing device that satisfies a predetermined threshold, wherein the proximity is determined based on first location data associated with the computing device and second location data associated with the user, and
      (2) whether the user is accessing the application;
   generating the dynamic content in accordance with the content template and the historical application data;
   inserting the dynamic content at the location in the document; and
   receiving, during the joint session, an input to the application from the user, wherein the input corresponds to a command for editing the dynamic content.

2. The method of claim 1, wherein the dynamic content includes a reference tag corresponding to the historical application data, and the command causes a value associated with the reference tag to be modified.

3. The method of claim 1, further comprising:
   scanning a WiFi network to identify one or more of the multiple users that are connected to the WiFi network.

4. The method of claim 1, further comprising:
   generating an attendee list according to which of the multiple users is participating in the joint session.

5. The method of claim 4, wherein the method further comprises:
   determining a degree of similarity between one or more instances of previous application data and current application data based on a comparison of a geographic location associated with each of the previous application data and the current application data; and
   selecting at least one of the one or more instances of previous application data based on the degree of similarity between the one or more instances of previous application data and the current application data.

6. The method of claim 1, further comprising:
   receiving, during the joint session, commands from the multiple users for editing the dynamic content.

7. The method of claim 5, wherein the degree of similarity is further determined based on a difference between dates associated with the one or more instances of previous application data and current application data being compared.

8. The method of claim 4, further comprising:
   determining a degree of similarity between the input from the user and the historical application data; and
   inserting additional content into the document based on the degree of similarity.

9. The method of claim 1, wherein identifying the historical application data includes searching the historical application data for data associated with a content tag of the content template.

10. The method of claim 1, wherein the dynamic content is linked to the application with a content tag that is associated with user-specific content data.

11. The method of claim 10, wherein the content tag specifies a format for the dynamic content in the document.

12. The method of claim 1, wherein the location in the document to insert the dynamic content is based on a position of a tag placed in the document by the user via a user interface.

13. The method of claim 1, further comprising:
   identifying, within at least one previously generated document, one or more locations of previous content produced by the content template,
   wherein the location in the document to insert the dynamic content is based on the one or more locations of previous content produced by the content template.

14. A computing device configured to generate document content, the computing device comprising:
   a processor; and
   a memory configured to store instructions that, when executed by the processor, cause the computing device to perform steps that include:
      creating a document using a content template that includes document data from a previously generated document;
      identifying a location in the document to insert dynamic content according to the content template, wherein the dynamic content is linked to an application that allows multiple users of a joint session of the application to concurrently edit the document in real time;
      providing permission to edit the document to a user of the multiple users of the joint session based on:
         (1) a proximity of the user to the computing device that satisfies a predetermined threshold, wherein the proximity is determined based on first location data associated with the computing device and second location data associated with the user, and
         (2) whether the user is accessing the application;
      generating the dynamic content in accordance with the content template;
      inserting the dynamic content at the location in the document.

15. The computing device of claim 14, wherein the dynamic content includes a reference tag corresponding to historical application data, and the steps further include:
   receiving, during the joint session, a first command to modify a value associated with the reference tag.

16. The computing device of claim 15, wherein the steps further include:
   receiving, during the joint session, an input to the application from the user, wherein the input corresponds to a second command for editing the dynamic content.

17. The computing device of claim 16, wherein the steps further include:
   receiving, during the joint session, commands from the multiple users for editing the dynamic content.

18. A non-transitory computer readable storage medium configured to store instructions that, when executed by a processor in a computing device, cause the computing device to perform steps that include:

creating a document using a content template that includes document data from a previously generated document;

identifying a location in the document to insert dynamic content according to the content template, wherein the dynamic content is linked to an application that is configured to allow multiple users of a joint session of the application to concurrently edit the document in real time;

providing permission to edit the dynamic content to a user of the multiple users of the joint session based on:
  (1) a proximity of the user to the computing device that satisfies a predetermined threshold, wherein the proximity is determined based on first location data associated with the computing device and second location data associated with the user, and
  (2) whether the user is accessing the application;

generating the dynamic content in accordance with the content template and a first input to the application from the user; and inserting the dynamic content at the location in the document.

19. The non-transitory computer readable storage medium of claim 18, wherein the steps further include:

receiving, during the joint session, a second input to the application from the user, wherein the
  input corresponds to a command for editing the dynamic content.

20. The non-transitory computer readable storage medium of claim 18, wherein the steps further include:

receiving, during the joint session, commands from the multiple users for editing the document.

* * * * *